(12) United States Patent
Stufflebeam

(10) Patent No.: US 7,484,110 B2
(45) Date of Patent: Jan. 27, 2009

(54) ADAPTIVE POWER MANAGEMENT

(75) Inventor: Kenneth W Stufflebeam, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/376,922

(22) Filed: Mar. 16, 2006

(65) Prior Publication Data
US 2007/0220291 A1    Sep. 20, 2007

(51) Int. Cl.
*H04N 7/16* (2006.01)
(52) U.S. Cl. .............................. 713/300; 713/1; 713/2; 713/310; 713/320; 713/321; 713/322; 713/323; 713/324; 713/330; 713/340
(58) Field of Classification Search .................... 713/1, 713/2, 300, 310, 320–324, 330, 340
See application file for complete search history.

(56) References Cited

U.S. PATENT DOCUMENTS

| | | | | |
|---|---|---|---|---|
| 6,710,578 | B1 * | 3/2004 | Sklovsky | 320/127 |
| 2004/0158878 | A1 * | 8/2004 | Ratnakar et al. | 725/150 |
| 2006/0288243 | A1 * | 12/2006 | Kim | 713/300 |

FOREIGN PATENT DOCUMENTS

| KR | 10-2005-0057822 A | 6/2005 |
|---|---|---|
| KR | 10-2005-0062005 A | 6/2005 |
| WO | 99/44140 A2 | 9/1999 |

OTHER PUBLICATIONS

Aversano, L., et al., "Integrating Document and Workflow Management Tools Using XML and Web Technologies: a Case Study," Proceedings of the Sixth European Conference on Software Maintenance and Reengineering, IEEE Computer Society, Mar. 11-13, 2002, pp. 24-33.
Bartoli, A., et al., "Graphical Design of Distributed Applications Through Reusable Components," IEEE Parallel & Distributed Technology: Systems & Applications 3(1):37-50, Spring 1995.

* cited by examiner

Primary Examiner—Abdelmoniem Elamin
(74) Attorney, Agent, or Firm—Wolf, Greenfield & Sacks, P.C.

(57) ABSTRACT

Embodiments of the present invention are directed at minimizing power consumption of a computer while permitting the execution of meaningful tasks by programs installed on the computer. In accordance with one embodiment, a method that implements power conserving measures based on the amount of capacity that is available from a power source is provided. More specifically, the method includes identifying the current amount of power that is available from a power source. Then a determination is made regarding whether the current amount of power available is associated with a reduced performance state. If the current amount of power is associated with a reduced performance state, the method changes the configuration of the power consuming devices to place the computer in the reduced performance state.

19 Claims, 2 Drawing Sheets

ADAPTIVE POWER MANAGEMENT

BACKGROUND

Market requirements, environmental needs, business costs, and limited battery life dictate that computers use as little energy as possible while still providing robust computing services. The energy consumed by a computer can be more efficiently managed by providing enough computational power for each service as needed instead of providing maximum computational power at all times. Computers such as a laptops, desktops, and mainframe computers, personal digital assistants (PDAs), cellular telephones, etc., provide services by causing program instructions to be executed by electronic circuitry. In this regard, various devices in a computer maintain electronic circuitry that consumes power so that services may be provided.

Most computers execute a computer program commonly referred to as an operating system that guides the operation of a computer and provides services to other programs. More specifically, an operating system controls the allocation and usage of hardware resources such as memory, mass memory storage, peripheral devices, etc. The computer instructions for initializing and operating the computing device are typically contained in a component of the operating system often referred to as the "kernel." Shortly after a computer is started, the kernel begins executing. Since a kernel has direct control of the hardware and access to data that describes the state of a computer, a kernel may be used to regulate computing power and otherwise control energy consumption.

Traditionally, the power management features provided by an operating system consists of quantifying the amount of processing being performed and transitioning between different system states (sometimes referred to as "S-states") based on the busyness/idleness of a computer. For example, some computers and their operating systems adhere to a standard commonly known as Advanced Configuration and Power Interface ("ACPI") that supports different system states including a active state (e.g., S0) and various system sleep states (e.g., S1-S4). Moreover, when a computer transitions between system states, power consuming devices on the computer may transition to an appropriate device state (sometimes referred to as "D-states") that includes a active state (e.g., D0) and various device sleep states (e.g., D1-D3). In this regard, the operating system may be responsible for maintaining state-to-device mappings so that individual devices may transition into an appropriate device state.

On one hand, each successively deeper system and associated device sleep states offer greater levels of power savings over the active state. On the other hand, higher system and device sleep states are each associated with reduced hardware availability. For example, a time period or latency overhead may be required to transition from a sleep state to the active state. In any event, with these types of existing systems, power management decisions do not account for the amount of remaining available power. As a result, the time period in which a user may perform meaningful tasks on a computer is short as power savings capabilities of certain hardware devices are not fully realized even when the amount of remaining power is very low.

SUMMARY

Generally described, embodiments of the present invention are directed at minimizing power consumption of a computer while permitting the execution of meaningful tasks by programs installed on the computer. In accordance with one embodiment, a method that implements power conserving measures based on the current power capacity that is available from a power source is provided. More specifically, in this embodiment, the method includes identifying the current amount of power that is available to the computer from the power source. Then, a determination is made regarding whether the current amount of power available to the computer is associated with a reduced performance state. If the current amount of power is associated with a reduced performance state, the method changes the configuration of some power consuming devices to place the computer in the appropriate reduced performance state.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention may be described in the general context of computer-executable instructions, such as program modules, being executed by a computer. Generally described, program modules include routines, programs, applications, widgets, objects, components, data structures, and the like that perform particular tasks or implement particular abstract data types. The present invention may also be practiced in distributed computing environments where tasks are performed by remote processing devices that are linked through a communications network. In a distributed computing environment, program modules may be located on local and/or remote computer storage media.

While the present invention will primarily be described in the context of reducing the power consumed by hardware devices on a computer when the amount of available power is below certain threshold amounts that may be arbitrarily set and reconfigured as needed, those skilled in the relevant art and others will recognize that the present invention is also applicable in other contexts. In any event, the following description first provides a general overview of a computer in which aspects of the present invention may be implemented. Then a routine or method for performing the invention in accordance with one embodiment is described. The illustrative examples described herein are not intended to be exhaustive or to limit the invention to the precise forms disclosed. Similarly, any steps described herein may be interchangeable with other steps or combinations of steps in order to achieve the same result.

Figure 1:
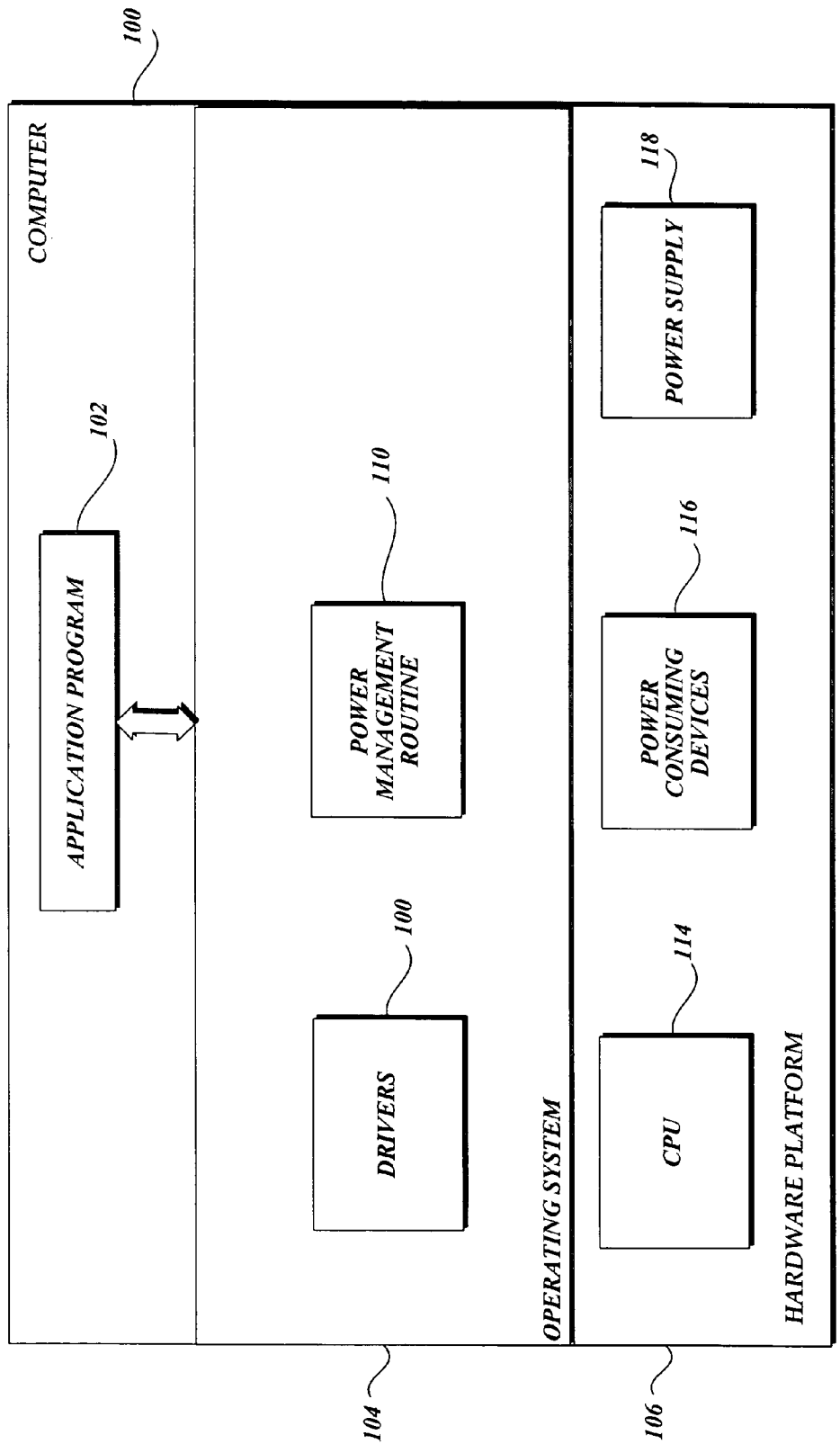
FIG. 1 is a block diagram of an exemplary computer with components that are suitable to implement aspects of the present invention.

Now with reference to FIG. 1, an exemplary computer 100 with both hardware and software components that are capable of implementing aspects of the present invention will be described. Those skilled in the art and others will recognize that the computer 100 may be any one of a variety of devices including, but not limited to, personal computing devices, server-based computing devices, mini- and mainframe computers, laptops, personal digital assistants ("PDAs"), or other electronic devices having some type of memory. For ease of illustration and because it is not important for an understanding of the present invention, FIG. 1 does not show the typical components of many computers, such as a memory, keyboard, a mouse, a printer, or other I/O devices, a display, etc. However, as illustrated in FIG. 1, the computer 100 includes an application program 102, an operating system 104, and a hardware platform 106. In this embodiment, the operating system 104 includes the drivers 108 and the power management routine 110. Moreover, as further illustrated in FIG. 1, the hardware platform 106 includes the CPU 114, the power consuming devices 116, and a power supply 118.

For illustrative purposes and by way of example only, FIG. 1 depicts a component architecture for a computer 100 in which an operating system 104 manages access to hardware resources on behalf of application programs. In this regard, the operating system 104 illustrated in FIG. 1 may be a general purpose operating system such as a Microsoft® operating system, Linux® operating system, UNIX® operating system, etc. Alternatively, the operating system 104 may be designed for specialized hardware such as limited resource computing devices. In this example, the operating system 104 may be a Windows® CE operating system, Palm® operating system, and the like. In any event, the components of the computer 100 are layered with the hardware platform 106 on the bottom layer and the application program 102 on the top layer. The layering of the computer 100 illustrates that the present invention may be implemented in a hierarchical environment in which each layer of the computer 100 is dependent on systems in lower layers. More specifically, the application program 102 is not able to directly access components of the hardware platform 106. Instead, the application program 102 issues requests to the operating system 104 when services provided by the hardware platform 106 are needed. As requests are received, the operating system 104 accesses the drivers 108 to interface with components of the hardware platform 106. For example, the drivers 108 provide a way for the operating system 104 to interface with the CPU 114 and the power consuming devices 116.

In accordance with one embodiment, the present invention extends the functionality of the operating system 104 to conserve power resources. In this regard, the operating system 104 is used to identify the hardware performance requirements of the application program 102 when the application program 102 is launched, or sometime thereafter. As the power capacity available from the computer 100 diminishes, the operating system 102 may transition the hardware platform 106 between different performance states which may occur within a given system and/or device state. Generally stated, aspects of the present invention extend the functionality of the operating system 104 so that the operating system 104 may act as an intermediary to match the performance requirements of the application program 102 with the capabilities of the hardware platform 106.

In order for the operating system 104 to manage the execution of programs, information that describes the hardware platform 106 is obtained. Typically, a firmware program commonly known as a Basic Input/Output System ("BIOS") performs functions for initializing the hardware platform 106 when power is first applied to the computer 100 after which the BIOS "boots" the operating system 104. In this regard, when the computer 100 is powered up, the computer's 100 BIOS conducts a hardware check, called a Power-On Self Test ("POST"), to determine whether the hardware platform 106 is present and working correctly. Then instructions in the BIOS direct control to a program commonly known as a "boot loader" that loads the operating system 104 into the computer's 100 system memory that is commonly implemented as a bank of random access memory ("RAM").

As illustrated in FIG. 1, the computer 100 includes a power supply 108 that is responsible for providing electronic circuitry in the computer 100 with power. The power supply 108 may be a battery that is contained within the housing of the computer 100. In this instance, as a user interacts with the computer 100, the amount of power capacity diminishes and may become unavailable if an uninterruptible power supply is not used to "recharge" the battery. Aspects of the present invention are especially well-suited when a battery is used to provide power to the computer. However, the power supply 108 may be an uninterruptible power supply in which the power capacity that is available to the computer 100 does not diminish. In this instance, aspects of the present invention may be used to conserve the consumption of power resources even though a seemingly infinite amount of power is available.

Typically, when the computer 100 boots, one or more drivers 108 may read data provided by a BIOS to discover the power management capabilities of the system devices in the hardware platform 106 or may identify the power management capabilities directly from the system devices through the drivers 100 or other configuration space information. In some systems, data provided by the BIOS or by direct operating system 104 determination is passed to a power regulating authority included in the operating system 104 which controls the power being expended by the computer 100. For example, as mentioned previously, in an operating system 104 that adheres to the ACPI standard, the power regulating authority may quantify the amount of processing being performed on the computer 100 and transition between different system states based on the idleness/busyness of the computer 100.

Aspects of the present invention may be implemented in a computer in which an existing power regulating authority transitions between different system states. In this embodiment, when the computer 100 is in the active system state (e.g., "S0") the adaptive power management system provided by the present invention may de-feature and/or reduce the performance state of specific hardware devices based on the current level of power capacity and/or the hardware performance needs of application programs that are executing on the computer 100. More specifically, as the power capacity available to the computer 100 diminishes, hardware device features and/or performance states are adjusted within a working system or device state to a level that is consistent with remaining power capacity. As a result, performance of a computer is set to a level that maximizes usage of the available power while still allowing a user to perform meaningful tasks. If the power regulating authority transitions out of the active state into a system sleep state, additional processing is not performed by the present invention. Instead, by transitioning between different system sleep states, the power regulating authority conserves power usage on the computer 100. In another embodiment, the present invention is implemented in a computer 100 in which a power regulating authority does not transition between different system states to conserve power. In this instance, hardware device features and/or performance states are adjusted by aspects of the present invention whenever conditions on the computer 100 dictate that power should be conserved such as when the amount of power available drops below certain threshold amounts.

As illustrated in FIG. 1, the computer 100 includes a CPU 114 that is included on the hardware platform 106. Those skilled in the art and others will recognize that the CPU 114 serves as the computational center of the computer 100 by supporting the execution of program instructions. In this regard, the operating system 104 causes program instructions, including program instructions that implement the present invention, to be loaded from a storage device (e.g., hard drive) into the system memory (not illustrated) of the computer 100. Then, the CPU 114 implements program functionality by sequentially "fetching" and "executing" instructions loaded in the system memory. Those skilled in the art others will recognize that some currently available CPUs support reduced power performance states such as (1) "P-states" in which the voltage/frequency pair of the CPU 114 may be adjusted to reduce energy consumption, and (2) "C-states" in which the CPU 114 is allowed to be idle for a predetermined percentage of time. As described in further detail below, aspects of the present invention may cause the CPU 114 to transition into a reduced power "P-state" or "C-state" even in instances when the computer 100 is in the active system state.

The power consuming devices 116 illustrated in FIG. 1 may be any existing or yet to be developed device that uses electricity provided by the power supply 118. For example, in existing computer systems, the power consuming devices 116 may include, but are not limited to, mass storage devices (e.g., hard drive), video cards, peripheral devices such as DVD/CD-ROM drives, network cards and adapters, hot-swappable devices, system memory (e.g., RAM/ROM), and the like. Generally described, aspects of the present invention are directed at adjusting the performance level of the CPU 114 and the other power consuming devices 116 to maximize usage of available power.

As illustrated in FIG. 1, the operating system 104 includes a power management routine 110 that adjusts the performance level of the CPU 114 and power consuming devices 116 to maximize the time period in which the computer 100 may perform meaningful tasks. However, since aspects of the power management routine 110 are described in detail below with reference to FIG. 2, a detailed description of the routine 110 will not be provided here. However, generally described, the power management routine 110 monitors the amount of power capacity that is available from the power supply 118. If the level of power capacity falls below certain threshold levels, the power management routine 110 identifies a reduced performance state for certain hardware devices on the computer 100. Then, the performance level of the identified hardware devices is adjusted to the identified reduced performance state. As the level of power available to the computer 100 declines, the hardware devices are transitioned into increasingly deeper reduced performance states that are designed to maximize the time period in which user may perform meaningful tasks on the computer 100.

Those skilled in the art and others will recognize that the computer 100 depicted in FIG. 1 is a highly simplified example that only includes components that are useful in describing aspects of the present invention. In actual embodiments, the computer 100 will have additional components not illustrated in FIG. 1. Moreover, the architecture of the components illustrated in FIG. 1 should be construed as exemplary as those skilled in the art and others will recognize that the present invention may be implemented in computers that maintain different component architectures.

Now with reference to FIG. 2 an exemplary power management routine 110 mentioned briefly above with reference to FIG. 1 will be described in further detail. Those skilled in the art and others will recognize that some hardware devices included with modern computers are configured to function at different performance levels and/or have features that are capable of being enabled/disabled. For example, standardized "D-states" are used to define performance levels for some hardware devices. In traditional power management schemes, each "D-state" that a device is capable of entering may be mapped to a system state. The power management routine 110 may use hardware devices that are configured to function at different performance levels, e.g., "D-states." However, unlike traditional power management schemes, the power management routine 110 may cause devices to transition into a more power conserving performance state within the active device state "D0" based on the amount of power that is available to a computer. As a preliminary matter, before the power management routine 110 is executed, an operating system installed on a computer may automatically obtain or query hardware devices to identify their power saving capabilities. In accordance with one embodiment, the power management routine 110 uses the information obtained by an operating system to match the performance requirements of programs with the capabilities of hardware devices to conserve power.

Figure 2:
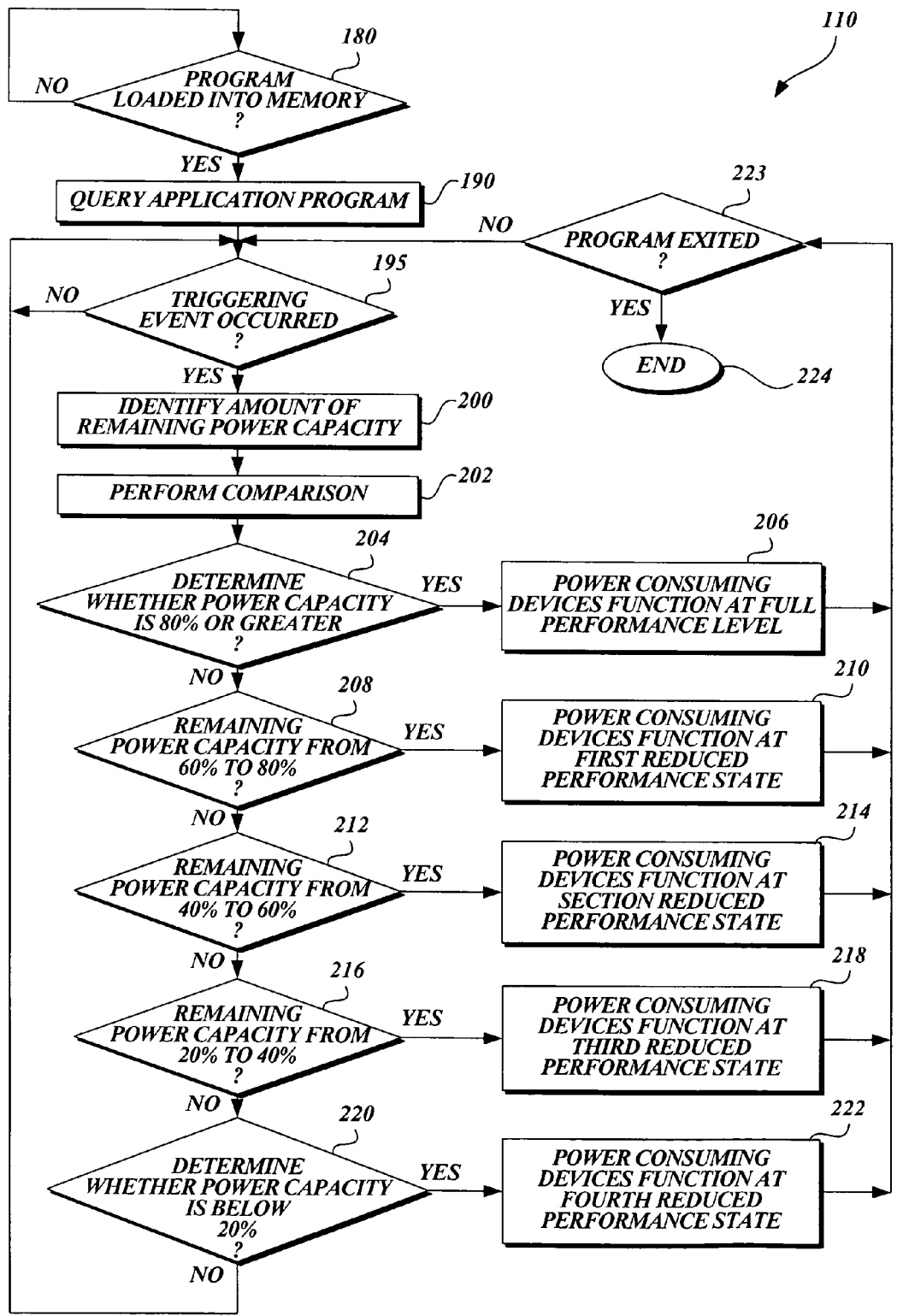
FIG. 2 is a functional flow diagram of a power management routine suitable to illustrate an exemplary method for identifying and performing performance state transitions to conserve power consumed by a computer in accordance with an embodiment of the present invention.

As illustrated in FIG. 2, the power management routine 110 begins at block 180, where the routine 110 remains idle until an application program is loaded into system memory. Those skilled in the art and others will recognize that when an application program is scheduled to be executed, program code on a storage device (e.g., hard drive) is loaded from the storage device into system memory where the program code is readily accessible to CPU. However, since loading program code into system memory is performed using existing systems that are generally known in the art, further description of these systems will not be described here.

At block 190, the power management routine 110 queries the application program that was loaded into system memory, at block 180, for hardware requirement set information. As described in further detail below, the power management routine 110 may cause hardware devices to transition into different performance states depending on the amount of power available to a computer. More specifically, in accordance with one embodiment, a hardware device may be in one of the five different performance states including a full performance state and four reduced performance states, each of which conserves increasingly larger amounts of power. The hardware requirement set information obtained from an application program describes the hardware requirements for the application program at each of the different available performance states. While the power management routine 110 describes a system where devices may be in one of five performance states, in alternative embodiments, more or fewer performance states may be implemented without departing from the scope of the claimed subject matter.

At decision block 195, the power management routine 110 waits until a triggering event occurs that will cause a determination to be made regarding whether a performance state transition will be performed. By way of example only, an operating system may be configured to issue the triggering event at periodic intervals or at random. Moreover, in another embodiment, the operating system is configured to issue a triggering event when the remaining power capacity falls below a certain threshold amounts. As described in further detail below, the power management routine 110 determines whether a performance state transition will be performed in response to the triggering event occurring.

At block 200, a value that represents the remaining power capacity available to a computer is obtained by the power management routine 110. Those skilled in the art and others will recognize that existing systems may be used to identify the amount of remaining power capacity that is available from a power source, at block 200. For example, computers that adhere to the ACPI provide a standardized way for an operating system to interface with a hardware platform and obtain this type of data. In this example, the power management routine 110 accesses a table or other data structure maintained by an operating system to obtain this data. However, those skilled in the art and others will recognize that other techniques may be used to obtain a value that represents the remaining power capacity, at block 200, and the example provided herein should be construed as exemplary and not limiting.

At block 202, the power management routine 110 performs a comparison between the value that represents the remaining power capacity (obtained at block 200) with a set of predetermined values associated with different performance states. Generally described, as the power capacity available to a computer diminishes, the power management routine 110 reduces the performance of some hardware devices. In accordance with one embodiment, the value that represents the remaining power capacity is compared to a set of predetermined values, at block 202, to identify a performance state for devices on the computer. By way of example only, if the amount of available power capacity is less than eighty percent (80%) of maximum, the power management routine 110 transitions a set of power consuming devices into a reduced performance state. However, it should be well understood that the values described herein that establish when a transition into a reduced performance state will occur are exemplary.

At decision block 204, the power management routine 110 determines whether the amount of remaining power capacity available from a power supply is 80% or higher. As mentioned previously, a comparison is performed at block 202 to identify an appropriate performance state for devices on a computer given the amount of power capacity that remains. At block 204, the power management routine 110 determines whether the results of that comparison indicate that the amount of remaining power capacity is 80% or higher. As illustrated in FIG. 2, if the amount of remaining power capacity is 80% or higher the power management routine 110 proceeds to block 206. Conversely, if the amount remaining power capacity is less than 80% of maximum, the power management routine 110 proceeds to block 208, described in further detail below.

At block 206, the power management routine 110 allows hardware devices on a computer that implements the present invention to function at their highest performance state. In one embodiment, when the available power capacity is 80% or higher, (1) a computer display sub-system provides the user with the richest visual experience; (2) power consuming device such as memory, CPU, video cards, mass storage, network devices and the like are allowed to perform with all of their features enabled, and (3) application programs such as screen savers are allowed to execute in accordance with user defined settings. Then the power management routine 110 proceeds to block 223, described in further detail below.

At decision block 208, the power management routine 110 determines whether the amount of remaining power capacity available from a power supply is from 60% to 80% of maximum. As mentioned previously, a comparison is performed at block 202 to identify an appropriate performance state for devices on a computer given the amount of power capacity that is available. As illustrated in FIG. 2, if the amount of remaining power capacity is from 60% up to 80% of maximum, the power management routine 110 proceeds to block 210. Conversely, if the amount remaining power capacity is less than 60% of maximum, the power management routine 110 proceeds to block 212, described in further detail below.

As further illustrated in FIG. 2, at block 210, the power management routine 110 causes certain power consuming devices on a computer that implements the present invention to transition into a first reduced performance state. The first reduced performance state is designed to provide a robust user experience while accounting for a less-than-maximum amount of available power. In one embodiment, when the available power capacity is from 60% up to 80% of maximum, certain high-end features available from a display sub-system (e.g., video card, computer display, etc.) that may or may not be utilized by application programs on a computer are "scaled-back" if the features are not currently being used. For example, in accordance with one embodiment, certain sub-system features such as, but not limited to, geometry mapping, 64-texturing, 128-bit computation, 32-bit color rendition, 3-D rendering engine and/or multiple GPUs are reduced to the next lower available performance state, at block 210, unless an application program requires the highest performance state of the feature. As mentioned previously, hardware requirements utilized by currently executing application programs are identified by the power management routine 110 as the programs are loaded into system memory. This information may be referenced, at block 210, to identify hardware features that may be "scaled back," in the first reduced performance state. Moreover, other power conserving measures are implemented, at block 210, that are not affected by the requirements of the currently executing application programs. For example, in one embodiment, the brightness of a display backlight in the video sub-system to 80% of maximum is made at block 210. Other power consuming devices, such as memory, CPU, network devices, and the like are allowed to function at a full performance level, in this embodiment. However, a mass storage device (e.g., hard drive) is put into a reduced feature state in which the mass storage device may "spin-down" when not being used. Then the power management routine 110 proceeds to block 223, described in further detail below.

At decision block 212, the power management routine 110 determines whether the amount of remaining power capacity available from a power supply is from 40% up to 60% of maximum. As mentioned previously, a comparison is performed at block 202 to identify an appropriate performance state for devices on a computer given the amount of power capacity that is available. As illustrated in FIG. 2, if the amount of remaining power capacity is from 40% up to 60% of maximum, the power management routine 110 proceeds to block 214. Conversely, if the amount remaining power capacity is less than 40% of maximum, the power management routine 110 proceeds to block 216, described in further detail below.

At block 214, the power management routine 110 causes hardware devices on a computer that implements the present invention to transition into a second reduced performance state. In one embodiment, when the available power capacity is from 40% up to 60% of maximum, features that may be available on a display sub-system are "scaled-back" even in instances when those features are currently being utilized. For example, common system display tasks are performed in "2-D," computational precision is adjusted from 128-bit to 64 bit, 64-bit texturing is reduced to 32-bit, color rendition is downgraded from 32-bit to 24-bit, and a display backlight is reduced to 70% of maximum brightness. Other computer components, such as memory, CPU, network devices, and the like are allowed to function at a full performance state. However, in one embodiment, a mass storage device is put into a further reduced performance state in which a power controlled "spin-up" sequence is performed when the mass storage device is accessed.

In the second reduced performance state, the timing of when an application program becomes active on the computer may influence power management decisions. For example, in accordance with one embodiment, when a new application program begins executing while the computer is in the second reduced performance state, the application is presented with de-featured hardware devices as the only devices that are available. By way of another example, if the active application program on a computer is a "screen saver" then certain power consuming devices are put into a reduced performance state. In one embodiment, when the "screen saver" is active a CPU transitions into "P2" and "C1" performance states. Then, the power management routine 110 proceeds to block 223, described in further detail below.

At decision block 216, the power management routine 110 determines whether the amount of remaining power capacity available from a power supply is from 20% up to 40% of maximum. As mentioned previously, a comparison is performed at block 202 to identify an appropriate performance state for devices on a computer given the amount of power capacity that is available. As illustrated in FIG. 2, if the amount of remaining power capacity is from 20% up to 40% of maximum, the power management routine 110 proceeds to block 218. Conversely, if the amount remaining power capacity is less than 20%, the power management routine 110 proceeds to block 220, described in further detail below.

At block 218, the power management routine 110 causes hardware devices on a computer that implements the present invention to transition into a third reduced performance state. When the available power capacity is from 20% up to 40% of maximum, features provided by power conserving devices on a computer that implements the present invention are reduced to satisfy the basic requirements of the currently executing application programs.

In accordance with one embodiment, the power management routine 110 adjusts the performance level of the power consuming devices 116 (FIG. 1) to match the basic requirements of currently executing application programs, at block 218. As mentioned previously, hardware requirements utilized by currently executing application programs are identified by the power management routine 110 as the programs are loaded into system memory. This information may be referenced, at block 218, to identify the basic requirements of the currently executing application programs. In this regard, an application program 102 may use a power consuming device to implement program functionality. However, an application program may not require all of the power consuming features of the device. In this instance, the power management routine 110 matches the features of a power consuming device with the basic requirement of the application program 102. For example, when the third reduced performance state is entered, the power management routine 110 may access system data to determine the types of application programs that are currently active on the computer. If none of the currently executing application programs require certain graphic rendering features; for example, if a user is only executing text-based programs such word processing programs, database applications, and the like, and is not executing a game with sophisticated graphics, then the display subsystem of the computer is put into a "text only" mode.

When the third reduced performance state is entered, the performance or device state (e.g., "D-state") are scaled-back further. For example, in accordance with one embodiment, system memory is placed into a "self refresh" mode and the performance of network devices are reduced if a decrease in power usage accompanies the reduction in performance. Moreover, mass storage devices are requested to operate at reduced speed e.g., a computer hard-drive operating speed may be reduced from 7200 to 5400 revolutions per minute. Then, the power management routine 110 proceeds to block 223, described in further detail below.

At decision block 220, the power management routine 110 determines whether the amount of remaining power capacity available from a power supply is less than 20% of maximum. As mentioned previously, a comparison is performed, at block 202, to identify an appropriate performance level for hardware devices on a computer, given the amount of power capacity that is available. As illustrated in FIG. 2, if the amount of remaining power capacity is less than 20% of maximum, the power conservation routine management routine 110 proceeds to block 222. Conversely, if the remaining power capacity is at critical levels that may be set at an arbitrary value, the operating system enters an exit strategy that is beyond the scope of the present invention. In this instance, the power management routine 110 may proceed back to block 195 and wait for a triggering event to occur.

As further illustrated in FIG. 2, at block 222, the power management routine 110 causes hardware devices on a computer that implements the present invention to transition into a fourth reduced performance state. The fourth reduced performance state is designed to provide resources that allow a user to perform meaningful tasks while aggressively conserving power. In one embodiment, when the available power capacity is less than 20% of maximum, certain features available on a display sub-system are no longer used. For example, use of high performance video memory available from a video card is discontinued in favor of low performance system memory. Moreover, in accordance with one embodiment, the number of available "pipes" or communication channels used by a video card is reduced to a number that is required to support the minimal requirements of the current application program.

When a computer is in the fourth reduced performance state, the use of other power consuming devices outside of the video sub-system are "scaled back" further or discontinued altogether. For example, in accordance with one embodiment, the CPU performance state is downgraded from "P0" to "P2" regardless of the current application program that is executing. Also, the amount of system memory that is available is reduced to the minimum amount required to support the current application program. Network devices that are not currently connected to the computer are disabled so that a search for the device does not have to be performed. Moreover, any power consuming device that is not currently being utilized are transitioned into the deepest available device state (e.g., "D3") unless needed by an application program or user. Externally attached hot-swappable devices such as a USB or FireWire drive are placed in a suspend state until an interrupt occurs that indicates the hot swappable device is needed. Then, the power management routine 110 proceeds to block 223.

As illustrated in FIG. 2, at decision block 223, the power management routine 110 determines whether the application program that was loaded into system memory at block 180 exited. In accordance with one embodiment, the power management routine 110 is used to regulate power consumed for each application program that is active on a computer. When an application program exits and is otherwise not represented as a process on the computer, the power management routine 110 terminates with regard to the exiting program. In this instance, the power management routine 110 proceeds to block 224, where it terminates. Conversely, if the application program loaded into system memory at block 180 is not exited, the power management routine 110 proceeds back to block 195, and blocks 195 through 222, repeat until the program does exit.

While specific examples of power conserving features and transitions to reduced performance states based on an available power supply have been described with reference to FIG. 2, this embodiment should be construed as exemplary and not limiting. For example, the power management routine 110 is described above as having four reduced performance states. However, in other embodiments, the power management routine 110 may have additional or fewer reduced performance states without departing from the scope claimed subject matter.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a computer with an operating system that manages power consuming devices on the computer, a computer-implemented method of conserving power consumption based on amount of power available to the computer, the method comprising:
   (a) obtaining for an application program active on the computer, hardware requirement set information that describes hardware requirements for the application program in a reduced performance state;
   (b) identifying the current amount of power available to the computer;
   (c) determining whether the current amount of power available to the computer corresponds with the reduced performance state; and
   (d) if the current amount of power corresponds with the reduced performance state, changing a configuration of the power consuming devices to place the computer in the reduced performance state.

2. The method as recited in claim 1, further comprising if the current amount of power does not correspond with a reduced performance state, allowing the power consuming devices to function at a full performance level.

3. The method as recited in claim 1, wherein the operating system implements an existing power conservation scheme that causes the computer to transition between different system states based on an idleness of the computer; and
   wherein the configuration of the power consuming devices is changed to conserve power when the computer is in an active system state.

4. The method as recited in claim 3, wherein the existing power conservation scheme uses an Advanced Configuration and Power Interface to facilitate communication between the power consuming devices and the operating system; and
   wherein changing the configuration of the power consuming devices to place the computer in the reduced performance state includes using the Advanced Configuration and Power Interface to place a power consuming device into a device sleep state.

5. The method as recited in claim 4, wherein identifying the current amount of power available to the computer includes performing a lookup in a data structure that is obtained using the Advanced Configuration and Power Interface.

6. The method as recited in claim 1, wherein determining whether the current amount of power available to the computer corresponds with the reduced performance state includes performing a comparison between a value that represents the amount of power available to the computer and threshold values that correspond with different reduced performance states.

7. The method as recited in claim 1, wherein changing the configuration of the power consuming devices to place the computer in the reduced performance state includes changing at least one feature provided by the power consuming devices to satisfy the hardware requirement set information of the application program.

8. The method as recited in claim 7, wherein changing at least one feature provided by the power consuming devices to satisfy the hardware requirement set information of the application program includes defeaturing at least one capability of the power consuming device.

9. The method as recited in claim 1, wherein changing the configuration of the power consuming devices includes identifying and deactivating features provided by the power consuming devices that are not currently utilized.

10. A software system for extending the time period in which a user may interact with application programs on a computer that includes a hardware platform with a power source and power consuming devices, the software system comprising:
    a computer-readable storage medium comprising computer-executable modules, the modules comprising:
       (a) an operating system that manages communication between the hardware platform and application programs on the computer;
       (b) drivers operative to report and access power reduction capabilities of the power consuming devices;
       (c) an application program; and
       (d) a power management routine operative to:
          (i) identify the amount of power that is available from the power source;
          (ii) reduce the performance of the power consuming devices to a state that conserves increasingly larger amounts of power as the amount of power available from the power source decreases; and
          (iii) reduce the performance of the power consuming devices to match hardware requirement set information obtained from the application program.

11. The software system as recited in claim 10, wherein the hardware platform of the computer communicates the power reduction capabilities of the power consuming devices to the operating system using an Advanced Configuration and Power Interface.

12. The software system as recited in claim 11, wherein the power management routine is further configured to change a device state of one or more power consuming devices when the computer is in an active system state.

13. The software system as recited in claim 10, wherein the power management routine is a component of the operating system that executes in kernel mode; and
    wherein the power management routine is further configured to extend the functionality of the operating system to match the performance requirements of an application program with the capabilities of the power consuming devices.

14. The software system as recited in claim 10, wherein the power management routine is further configured to identify and deactivate features provided by the power consuming devices that are not currently utilized.

15. The software system as recited in claim 14, wherein features that may be deactivated in the display subsystem of the computer, include:
   (a) a graphical processing unit that performs processing on behalf of a video card;
   (b) pipes or communication channels used by a video card that are not required to support the needs of the current application program; and
   (c) video card memory that stores data on behalf of the video card.

16. The software system as recited in claim 14, wherein the power management routine is further configured to reduce features provided by the power consuming devices to a next highest performance state when the amount of available power is below a threshold value.

17. A computer-readable storage medium bearing computer-executable instructions which, when executed in a computer that includes a power source, power consuming devices, and an operating system, carries out a method for extending the time period in which a user may interact wit an application program on the computer, the method comprising:
   (a) obtaining, for the application program, hardware requirement set information that describes hardware requirements for the application program in a reduced performance state;
   (b) identifying the current amount of power available to the computer from the power source;
   (c) identifying an appropriate performance state for the power consuming devices based on the amount of power that is available from the power source; and
   (d) in response to determining tat the amount of available power is the below a threshold value that corresponds with the reduced performance state, changing a configuration of the power consuming devices to meet the hardware requirements described by the hardware requirement set information so that the computer operates in the reduced performance state.

18. The computer-readable storage medium as recited in claim 17, wherein an existing power conservation scheme is implemented on the computer that supports different system states; and
   wherein the configuration of the power consuming devices is changed to conserve power when the computer is in the active system state.

19. The computer-readable storage medium as recited in claim 18, wherein the existing power conservation scheme uses the Advanced Configuration and Power Interface to facilitate communication between the power consuming devices and the operating system; and
   wherein changing the configuration of the power consuming devices includes using the Advanced Configuration Power Interface to place one or more of the power consuming devices into a device sleep state.

* * * * *